June 12, 1956  J. B. NEMETH  2,749,943
ARTICLE OF MANUFACTURE AND PROCESS OF MAKING SAME
Filed April 1, 1955

INVENTOR
JOHN B. NEMETH
BY *Paris I. Poindexter*
AGENT

2,749,943
ARTICLE OF MANUFACTURE AND PROCESS OF MAKING SAME

John B. Nemeth, Meriden, Conn., assignor to E. I. du Pont de Nemours and Company, Wilmington, Del., a corporation of Delaware Application April 1, 1955, Serial No. 498,600

6 Claims. (Cl. 138—55)

This invention relates to air springs for automobiles, buses, trucks and the like, particularly to a seamless flexible sleeve-like member which forms a seal between the open ends of two cylindrical chambers to form a common air chamber and more particularly to the process of making the sleeve-like member.

Air springs of the type in which a portion of one cylinder reciprocates within a portion of another cylinder have been proposed as far back as 1901, for example, as shown in U. S. Patent 691,190. Such springs have not, however, met with commercial success due to the failure of the seal between the reciprocating cylinders. The sealing elements employed in the past have failed due to lack of oil and grease resistance, cracking and breaking on repeated flexings, lack of flexibility at low temperatures, and lack of sufficient strength to prevent bursting when subjected to sudden thrusts of pressure as high as 100 p. s. i.

An object of this invention is to form a flexible sleeve-like member which can be adhere to the wall at the open ends of two cylindrical air chambers, effecting a seal to form a common closed air chamber between the two cylinders, in which a portion of one chamber extends into the other chamber and both chambers are free to move with respect to each other, thereby decreasing or increasing the volume of the common air chamber. Another object is to provide a flexible sleeve which will withstand the sudden thrusts of high pressure in the order of more than 100 p. s. i. without rupture. A further object is to provide a flexible sleeve which will remain flexible at relatively low temperatures. A still further object is to provide a flexible sleeve which is not deleteriously affected by lubricating greases, and various chemicals, tars, etc. which are splashed up from the road surface. A more specific object is to provide a synthetic elastomer coated nylon knit fabric sleeve-like member which is resistant to delamination upon repeated flexing even over a wide temperature range. These and other important objects will become readily apparent as the description of the invention proceeds.

The objects of this invention are accomplished by forming a nylon knitted tube, treating the tube with a dilute solution of a synthetic elastomer containing a polyisocyanate, wrapping a preformed curable synthetic elastomeric sheet around a mandrel, sliding the treated nylon tube over the sheet stock on the mandrel, applying pressure to the entire assembly supported by the mandrel, curing the elastomeric portions of the assembly by heating, whereby the elastomer is permanently attached to the nylon knitted tube, releasing the pressure, and removing from the mandrel the nylon knitted tube with cured elastomeric compound firmly bonded thereto.

Features of the invention, other than those adverted to, will be apparent from the hereinafter detailed description and appended claims, when read in conjunction with the appended drawing.

Figure 1:
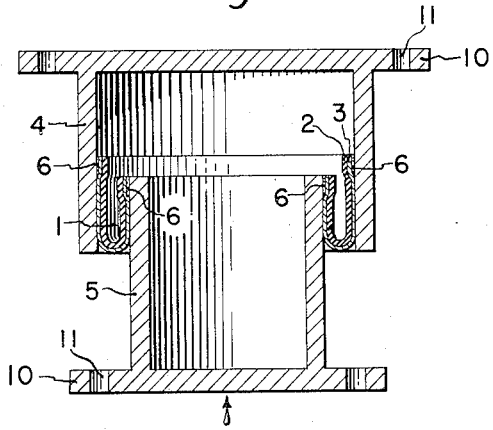
Figure 1 is a cross-section illustration showing the flexible sleeve attached to two cylinders to form an air seal between them.
Figure 2:
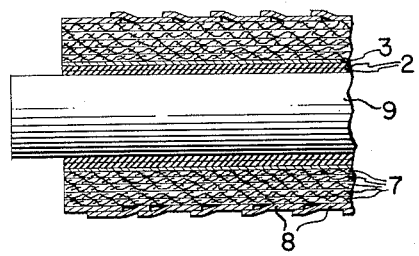
Figure 2 is a fragmental cross-section illustration of the lay up on a mandrel for curing the synthetic elastomeric coating while under slight pressure.
Figure 3:
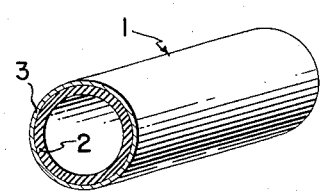
Figures 3 and 4 are perspective views of the flexible sleeve showing one side and both sides, respectively, of the nylon knitted tube covered with a synthetic elastomeric compound.
Figure 4:
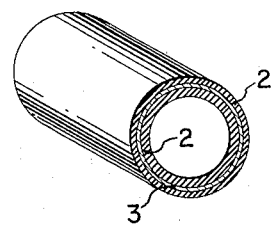

With reference to the accompanying drawing Figure 1 represents an air spring assembly in which the tubular sleeve 1 forms a seal between the two chambers 4 and 5 by means of an adhesive 6. Figure 2 represents the assembly laid up on a mandrel 9 in which the separate components of the assembly are as follows: 2 represents a curable elastomeric sheet stock wrapped around mandrel 9; 3 represents nylon knitted tube treated with a synthetic elastomer-polyisocyanate primer; 7 represents a plurality of convolutions of untreated finely woven fabric and 8 represents spirally wound tape. Figure 3 represents the flexible seamless sleeve-like member after the wrappings 8 and 7 are removed and it is slipped from the mandrel. Figure 4 illustrates a flexible seamless sleeve with a layer of cured synthetic elastomer sheet stock 2 on each side of the primed nylon knitted tube 3.

The following specific examples are given by way of illustration and not limitation.

EXAMPLE I

A seamless nylon knitted tubing 3 measuring 3½ inches in lay flat diameter and 7 inches in length, weighing two ounces per linear yard, formed from 13 filament yarn—40 denier filament having five Z turns per inch, with 23 wales and 30 courses per inch, is slipped over a mandrel 9 having a diameter of 3⅜ inches and a length greater than seven inches. The nylon knitted tube mounted on the mandrel 9 was coated or painted with the following primer composition:

*Primer solution for nylon knitted tube*

| | Percent by wt. |
|---|---|
| Neoprene GNA | 12.80 |
| Piperidinium pentamethylene dithiocarbamate | .03 |
| Magnesium oxide | .51 |
| 50% solution methylene bis(4 phenyl isocyanate) in ortho dichlorobenzene | 6.66 |
| Toluol | 80.00 |
| | 100.00 |

The above composition was sufficiently fluid to penetrate into and through the nylon knitted tube. After drying, the primed fabric tube 3 was removed from the mandrel 9 and turned inside out.

The following compound was mixed on a two roll rubber mill and then transferred to a calender where it was sheeted out in the form of a stock .015 inch thick.

*Sheet stock compound*

| | Percent by wt. |
|---|---|
| Neoprene GNA | 50.00 |
| Magnesium oxide | 2.00 |
| Zinc oxide | 2.50 |
| Carbon black | 35.19 |
| Circo oil (light petroleum oil) | 6.55 |
| Phenyl beta naphthylamine | 1.00 |
| Stearic acid | 2.00 |
| Diortho tolyguanidine salt of dicatechol borate | .25 |
| Mixed dixylol disulfide | .51 |
| | 100.00 |

A strip of the above mentioned slightly tacky sheeted stock, about 8 inches wide, was wrapped around the 3⅜ inch diameter mandrel 9 after precoating it with a silicone mold release agent. Two layers of the sheeted compound 2 were wrapped around the mandrel 9 with about ½ inch overlap at the end. The primed nylon knitted tube 3 was then drawn over the sheet stock 2 wrapped mandrel 9 and intimate contact obtained by rolling with a hand roller. The entire assembly was next tightly wrapped with a plurality of convolutions of an untreated cotton lawn fabric 7 and finally tightly wrapped spirally with one inch wide fabric tape 8. The assembly was then cured in an atmosphere of saturated steam (60 p. s. i. gauge—307° F.) for 1½ hours in an autoclave to cure the neoprene and effect a strong bond between the sheet stock 2 and the nylon knitted tube 3. After the cure the spirally wrapped tape 8 and cotton lawn fabric 7 were removed, the sleeve 1 was slipped off the mandrel 9 and trimmed to a length of 6 inches.

The sleeve 1 was then installed as the seal between reciprocating cylinders having a stroke of 2 to 3 inches to form a common air chamber as illustrated in Figure 1 of the drawing. The air spring assembly is attached to a vehicle by means of bolts through holes 11 in flanges 10.

A suitable adhesive system 6 for adhering the fabric side of the sleeve 1 to the side walls of the cylinders 4 and 5 is as follows: The area of the metal cylinders 4 and 5 to be joined to sleeve 1 are cleaned and degreased and a primer of the following composition is applied:

*Metal primer*

| | Percent by wt. |
|---|---|
| Chlorinated rubber | 20.0 |
| Toluol | 80.0 |
| | 100.0 |

After the metal primer is dried, the primed portion of the metal cylinders and the portions of the sleeve to be adhered thereto are coated with the following composition:

*Metal cement*

| | Percent by wt. |
|---|---|
| Neoprene AC | 13.4 |
| Neoprene GN-M2 | 4.5 |
| Phenyl betanaphthylamine | .3 |
| Magnesium oxide | .7 |
| Zinc oxide | .9 |
| Lauryl amine | .1 |
| Butyraldehyde monobutylamine condensation product | .1 |
| Toluol | 80.0 |
| | 100.0 |

The coated surfaces are allowed to dry until they are solvent free but tacky. The tacky surfaces on the metal cylinders and sleeve are then pressed into intimate contact, after which the cements are then cured for 2 hours at about 260° F. The resulting air-tight seal between the two cylinders formed a closed air chamber. The sleeve 1 forming the seal was flexed 3,000,000 times by causing one cylinder to reciprocate 2 to 3 inches relative to the other without any failure, such as delamination of the cured elastomer coating 2 from the nylon knitted tube 3, rupture of the nylon knitted tube 3 or elastomeric coating or covering 2, or separation of the sleeve 1 from the metal cylinders 4 and 5.

EXAMPLE II

A flexible sleeve having a synthetic elastomeric coating on each side of a nylon knitted tube was prepared from the same materials as described above in Example I, as illustrated in Figure 4 of the drawing. In this example the nylon knitted tube was dipped into the above described fabric primer solution, the excess was allowed to drain off and the tube was dried. An 8 inch strip of the above described slightly tacky sheet stock 2 .015 inch thick was wrapped around the 3⅜ inches diameter mandrel 9 once with about ½ inch overlap at the end.

The primed nylon knitted tube 3 was drawn over the sheet stock 2 wrapped mandrel 9. One layer of the sheet stock 2 was wrapped around the primed nylon knitted tube 3 with a ½ inch overlap. Intimate contact of the various components supported on the mandrel 9 was accomplished by hand rolling. Pressure was applied to the assembly by wrapping with a fine weave cotton lawn fabric 7 and one inch tape 8 as described above in Example I. The assembly was cured in an atmosphere of steam in an autoclave (60 p. s. i.—307° F.) for a period of 1½ hours. After the cure the spirally wrapped tape 8 and the untreated fabric 7 were removed and the sleeve 1 was removed from the mandrel 9. The sleeve was ideally suited for forming a seal between reciprocating cylinders to form a common air chamber of varying volume as shown in Figure 1 of the drawing. This particular construction has the added advantage of increased strength and the nylon knitted tube is further protected from exposure to oils, greases, grit and various chemicals applied to road surfaces.

It is to be understood that the invention is not to be limited to any particular nylon knitted construction, since the weight of the vehicle on which the air springs are installed will determine the strength required for the sleeve member.

An important feature of this invention is the primer used to treat the nylon knitted tube before combining to the curable synthetic elastomer sheet stock. While neoprene is the preferred synthetic elastomer, other curable synthetic elastomers may be used, such as e. g., "Hycar" (copolymer of butadiene and acrylonitrile), "Buna-S" (copolymer of butadiene and styrene) and chlorosulfonated polyethylene.

An important component in the primer for the nylon knitted tube is the polyisocyanate, which promotes adhesion of the elastomeric sheet stock to the nylon knitted tube and the metal cylinders. Any one of a large number of polyisocyanates may be used in place of the methylene bis(4 phenyl isocyanate) mentioned in the specific example. Examples of other polyisocyanates, polyisothiocyanates and mixed isocyanate-isothiocyanate compounds which may be used includes the following: hexamethylene diisocyanate, paraphenylene diisocyanate, 2,3-dimethyl-tetramethylene diisocyanate, decamethylene diisocyanate, hexamethylene diisothiocyanate, para,-para'-diphenylene diisocyanate, 2-chlorotrimethylene diisocyanate, 5-nitro-1,3-phenylene diisocyanate, ethylene diisocyanate, dodecamethylene diisocyanate, butane-1,2,2-triisocyanate, ethylene diisothiocyanate, meta-phenylene diisocyanate, para-phenylene diisothiocyanate, hexamethylene-1-isocyanate-4-isothiocyanate, benzene-1,2,4-triisothiocyanate, polymethylene diisocyanates and diisothiocyanates, such as trimethylene diisocyanate, tetramethylene diisocyanate and pentamethylene diisocyanate, the corresponding isothiocyanates; alkylene diisocyanates and diisothiocyanates, such as propylene-1,2-diisocyanate, butylene-1,2-diisocyanate, butylene-1,3-diisocyanate, butylene-2-3-diisocyanate, and butylene-1,3-diisothiocyanate; alkylidene diisocyanates and diisothiocyanates, such as ethylidene diisocyanate ($CH_2CH(NCO)_2$), butylidene diisocyanate $$(CH_3—CH_2—CH_2—CH(NCO)_2)$$

cyclo-alkylene diisocyanates and diisothiocyanates, such as cyclo-hexylene-1,2-diisocyanate; aromatic diisocyanates and diisothiocyanates, 1-methylphenylene-2,4-diisocyanate, naphthylene-1,4-diisocyanate; aliphatic aromatic diisocyanates or diisothiocyanates, such as xylylene diisocyanate, xylylene diisothiocyanate, and diisocyanates and diisothiocyanates containing hetero atoms such as

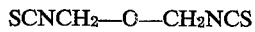

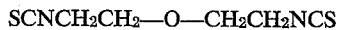

and         SCN(CH2)3—S—(CH2)3NCS

In large scale production it will be advantageous to prepare the sleeves in extended lengths and then cut them into sections of desired lengths after the final curing operation.

The formulation of the sheet stock employed for covering the primed nylon knitted tube may vary over a wide range, depending of course on the particular grade and type of synthetic elastomer employed and the specific conditions under which the end product is to be used. It is well known by those skilled in the art of formulating synthetic elastomeric compounds that each elastomer requires its own particular types of fillers, curing agents, accelerators, and additives. As in the case of the primer for the nylon knitted tube, the elastomeric sheet stock may be prepared from neoprene, "Hycar," "Buna-S" and chlorosulfonated polyethylene.

In the specific examples the thickness of the neoprene covering on the nylon knitted tube was such as to be suitable for use under normal road conditions on an average weight passenger automobile. It will be readily understood that for heavier or lighter vehicles and for more or less severe road conditions a correspondingly heavier or lighter construction of the sleeve member will be required, such as, heavier or lighter nylon knitted tube, and thicker or thinner synthetic elastomeric coverings.

It will be readily understood by those skilled in the synthetic elastomeric fabricating art that the method of applying pressure and heat to the elastomeric coating on the primed nylon knitted tube during curing may be varied. For example, in place of the fabric wrappings pressure may be applied to the mandrel supported sleeve by means of a split pressure mold or by inflatable curing bags. The heat may be applied by means of steam, hot air or radiation.

For convenience in removing the cured sleeves from the mandrel it may be formed in segments which permit collapsing inwards after the curing is completed.

The primary advantages of the product of this invention are the strong bond formed between the primed nylon knitted tube and the sides of the metal cylinders forming the air chamber and the strong bond between the nylon knitted tube and the neoprene or other elastomeric sheet stock. This is accomplished through the synthetic elastomer polyisocyanate primer coat applied to the nylon knitted tube. Another important advantage of the product of this invention is the resistance to delamination and bursting upon repeated flexing under high pressure. This is accomplished by employing a nylon knitted tube as the fabric base.

The flexible sleeve is designed primarily for use as a seal between two cylinders to form a common air chamber in the construction of vehicular air springs. The flexible sleeves will also find use in other fields, such as flexible joints between section of pipes and tubes.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

I claim:

1. A seamless flexible tubular sleeve, adapted for forming a seal and a common air chamber between two cylinders when one cylinder extends into the other, comprising a nylon knitted tube impregnated with a primer comprising a synthetic elastomer and a polyisocyanate, said synthetic elastomer being selected from the group which consists of neoprene, a copolymer of butadiene and acrylonitrile, a copolymer of butadiene and styrene, and chlorosulfonated polyethylene, said impregnated nylon knitted tube having a surface covering on at least one side of a cured synthetic elastomeric compound comprising a synthetic elastomer selected from the group mentioned above.

2. The product of claim 1 in which the cured elastomeric coating is on both sides of the primed nylon knitted tube.

3. The product of claim 1 in which the nylon knitted tube is primed with neoprene and methylene bis(4 phenyl isocyanate).

4. The product of claim 1 in which the synthetic elastomer in the primer coat and surface coating is neoprene.

5. The process of forming a seamless flexible sleeve for joining two cylinders when one cylinder extends into the other and forming a common air chamber, comprising treating a nylon knitted tube with a primer solution of a synthetic elastomer and a polyisocyanate, drying the treated tube, wrapping a curable synthetic elastomeric sheet stock around a mandrel, placing the primed tube thereover, applying pressure to the entire assembly, curing the assembly under pressure, at an elevated temperature, releasing said pressure and removing the assembly from the mandrel.

6. The process of forming a seamless flexible sleeve for joining two cylinders to form them into a common air chamber with a portion of one of said cylinders extending into a portion of the other cylinder, comprising treating a nylon knitted tube with a primer solution of a synthetic elastomer and a polyisocyanate, drying the treated tube, wrapping a curable synthetic elastomeric sheet stock around a mandrel, placing the primed tube over the mandrel supported sheet stock, wrapping a curable synthetic elastomeric sheet around the primed nylon knitted tube, applying pressure to the entire assembly supported by the mandrel, curing the assembly under pressure at an elevated temperature, releasing said pressure and removing the assembly from the mandrel.

No references cited.